(12) United States Patent
Jo

(10) Patent No.: US 10,482,087 B2
(45) Date of Patent: Nov. 19, 2019

(54) STORAGE SYSTEM AND METHOD OF OPERATING THE SAME

(71) Applicant: SAMSUNG ELECTRONICS CO., LTD., Suwon-si (KR)

(72) Inventor: Insoon Jo, Hwasung (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 339 days.

(21) Appl. No.: 15/058,298

(22) Filed: Mar. 2, 2016

(65) Prior Publication Data

US 2016/0292229 A1 Oct. 6, 2016

(30) Foreign Application Priority Data

Mar. 30, 2015 (KR) .................. 10-2015-0044347

(51) Int. Cl.
*G06F 16/00* (2019.01)
*G06F 16/2453* (2019.01)

(52) U.S. Cl.
CPC .............. *G06F 16/24542* (2019.01)

(58) Field of Classification Search
CPC ......... G06F 17/30463; G06F 17/30498; G06F 17/30451; G06F 17/30466; G06F 17/30389; G06F 17/30424; G06F 17/30442; G06F 17/30477; G06F 17/30483; G06F 17/30548; G06F 17/30864; G06F 16/24542
USPC ................................. 707/705–780
See application file for complete search history.

(56) References Cited

U.S. PATENT DOCUMENTS

| | | | |
|---|---|---|---|
| 7,401,069 B2 | 7/2008 | Day et al. | |
| 7,499,917 B2 | 3/2009 | Purcell et al. | |
| 7,620,615 B1 * | 11/2009 | Milby | G06F 16/24524 |
| 8,051,069 B2 | 11/2011 | Johnson et al. | |
| 8,214,352 B2 | 7/2012 | Lamb et al. | |
| 8,244,715 B2 | 8/2012 | Cole et al. | |
| 8,244,718 B2 | 8/2012 | Chamdani et al. | |
| 8,352,459 B2 | 1/2013 | Pennell, Sr. et al. | |
| 8,380,738 B2 * | 2/2013 | Tatemura | G06F 16/25 707/770 |
| 8,533,182 B1 * | 9/2013 | Charboneau | G06F 16/90335 707/718 |
| 8,914,353 B2 | 12/2014 | Dees et al. | |
| 2005/0060293 A1 | 3/2005 | Day et al. | |
| 2006/0173833 A1 | 8/2006 | Purcell et al. | |
| 2006/0200451 A1 * | 9/2006 | Kosuru | G06F 16/24544 |
| 2008/0183688 A1 | 7/2008 | Chamdani et al. | |
| 2009/0171890 A1 | 7/2009 | Johnson et al. | |
| 2009/0319474 A1 * | 12/2009 | Bestgen | G06F 16/2453 |
| 2010/0131490 A1 | 5/2010 | Lamb et al. | |
| 2011/0022583 A1 | 1/2011 | Pennell, Sr. et al. | |
| 2011/0035368 A1 | 2/2011 | Cole et al. | |

(Continued)

*Primary Examiner* — Michelle N Owyang
(74) *Attorney, Agent, or Firm* — Sughrue Mion, PLLC

(57) ABSTRACT

A storage system includes a data storage including a nonvolatile memory device configured to store data classified into tables, and a storage controller configured to control the nonvolatile memory device; and a host configured to generate a query plan based on the tables according to a query request, and to execute the query plan to thereby read filtered data from the data stored in the nonvolatile memory device, and the storage controller includes a pattern matcher configured to generate and output the filtered data from the data stored in the nonvolatile memory device by performing a filtering operation.

20 Claims, 10 Drawing Sheets

(56) References Cited

U.S. PATENT DOCUMENTS

| | | |
|---|---|---|
| 2011/0055199 A1* | 3/2011 | Siddiqui ............. G06F 16/2456 707/714 |
| 2012/0117027 A1 | 5/2012 | Shau et al. |
| 2012/0130986 A1* | 5/2012 | Abdellatif ......... G06F 16/24542 707/718 |
| 2012/0290559 A1 | 11/2012 | Fuller et al. |
| 2013/0159285 A1 | 6/2013 | Dees et al. |
| 2013/0297646 A1 | 11/2013 | Watari |
| 2014/0089294 A1 | 3/2014 | Shankar et al. |
| 2014/0281512 A1* | 9/2014 | Arasu ................... G06F 21/602 713/165 |

* cited by examiner

FIG. 5

```
SELECT s_acctbal, s_name, n_name, p_partkey, p_mfgr, s_address, s_phone, s_comment
FROM part, supplier, partsupp, nation, region
WHERE p_partkey = ps_partkey AND s_suppkey = ps_suppkey AND
      p_size = 15 AND p_type LIKE '%BRASS' AND
      s_nationkey = n_nationkey AND n_regionkey = r_regionkey AND r_name = 'EUROPE'
      AND ps_supplycost = (
          SELECT MIN(ps_supplycost)
          FROM partsupp, supplier, nation, region
          WHERE p_partkey = ps_partkey AND s_suppkey = ps_suppkey AND
                s_nationkey = n_nationkey AND n_regionkey = r_regionkey AND
                r_name = 'EUROPE')
ORDER BY s_acctbal desc, n_name, s_name, p_partkey
LIMIT 100;
```

FIG. 6

| Join Order | 1 | 2 | 3 | 4 | 5 |
|---|---|---|---|---|---|
| Table | Part | Partsupp | Supplier | nation | region |
| Number of Records | 2,000,000 | 8,000,000 | 100,000 | 25 | 5 |
| Search Condition | p_size = 15 AND p_type LIKE '%BRASS' | – | – | – | r_name = 'EUROPE' |
| Join Type | Filtering | part key | supplier key | nation key | Region key |

STORAGE SYSTEM AND METHOD OF OPERATING THE SAME

CROSS-REFERENCE TO RELATED APPLICATION

This U.S. non-provisional patent application claims priority under 35 USC § 119 to Korean Patent Application No. 10-2015-0044347, filed on Mar. 30, 2015, which is hereby incorporated by reference in its entirety.

BACKGROUND

1. Field

The exemplary embodiments relate to storage systems and, more particularly, to a data storage and a storage system including a database manager to manage the data storage.

2. Description of the Related Art

In a database system, one of the most effective methods of reducing a user's query processing time is to minimize data migration between a host and a storage device. A representative one of the methods is early filtering to transmit only required data to a host.

Although various types of hardware to support early filtering have been proposed, each of these types of hardware are hardware accelerated processors designed with hardware. A hardware accelerated processor is subordinate to a database management system (DBMS). That is, since a query parsing and processing logic of the DBMS must be implemented with hardware, it is difficult for the hardware to support various types of DBMS.

Accordingly, it is important to develop general-purpose intellectual property (IP) to support not only early filtering but also various types of DBMS and a DBMS to manage the IP.

SUMMARY

The exemplary embodiments relate to a storage system capable of effectively searching data.

According to an aspect of an exemplary embodiment, there is provided a storage system including: a data storage including: a nonvolatile memory device configured to store data classified into tables, and a storage controller configured to control the nonvolatile memory device; and a host configured to generate a query plan based on the tables according to a query request, and to execute the query plan to thereby read filtered data from the data stored in the nonvolatile memory device, wherein the storage controller includes a pattern matcher configured to generate and output the filtered data from the data stored in the nonvolatile memory device by performing a filtering operation.

The host may include a database manager including: a query optimizer configured to generate the query plan by selecting a table, from among the tables, associated with a search condition that does not refer to other tables as a first join order; an execution engine configured to make a request for execution of the query plan according to the query plan; and a storage engine configured to generate a binary pattern from a search condition associated with the selected table among a plurality of search conditions according to the request for execution of the query plan.

The query optimizer may be configured to generate the query plan based on a number of records of each of the tables and a number of search conditions of the query request.

The query optimizer may be configured to generate the query plan by applying a permutation to the other tables except for the selected table to minimize data input or output.

The storage engine may further include a query parser configured to parse the query request to determine whether an error exists.

The storage controller may include a nonvolatile memory interface configured to transmit or receive data to or from the nonvolatile memory device, and the pattern matcher may be provided in the nonvolatile memory interface and may be configured to perform the filtering operation based on the binary pattern.

The host may further include a buffer configured to temporarily store a query execution result generated based on information of a page including data matching the binary pattern as a result of the filtering operation.

The information of the page may include one of a match flag indicating whether the page comprises data matching the binary pattern and information on a start offset and an end offset where the matching arises in the page.

According to an aspect of another exemplary embodiment, there is provided a method of operating a storage system including a data storage and a host configured to manage data classified into tables stored in the data storage, the method including: generating a query plan based on the tables according to a query request; and executing the query plan to read filtered data from data stored in the data storage, wherein the method further includes generating and outputting the filtered data using a pattern matcher provided in a storage controller configured to control the data storage.

The generating of the query plan may include: selecting a table, from among the tables, associated with a search condition which does not refer to other tables as a first join order.

The selecting the table may include selecting the table based on a number of records of each of the tables and a number of search conditions of the query request.

The method may further include applying a permutation to the other tables except for the selected table to minimize data input or output of the data storage.

The executing of the query plan may include: making a request for execution of the query plan according to the query plan; generating a binary pattern from a search condition associated with the selected table among a plurality of search conditions according to the request for execution of the query plan; and searching data matching the binary pattern.

The executing of the binary plan may further include: reading a page including the data matching the binary pattern; searching data corresponding to the query request referring to a key value corresponding to each of the other tables except for the selected table; and outputting a final search result based on the read page and the searched data.

The generating of the query plan may further include: parsing the query request to check whether an error exists in the query request.

According to the exemplary embodiments, a storage system capable of effectively searching data may be provided.

BRIEF DESCRIPTION OF THE DRAWINGS

The forgoing and other features of exemplary embodiments will be described below in more detail with reference to the accompanying drawings of non-limiting exemplary embodiments in which like reference characters refer to like parts throughout the different views. The drawings are not necessarily to scale, emphasis instead being placed upon illustrating principles of exemplary embodiments. In the drawings:

FIG. 5 illustrates an example of a user's query;

FIG. 6 is a table of a query plan generated according to an exemplary embodiment;

DETAILED DESCRIPTION

Figure 1:
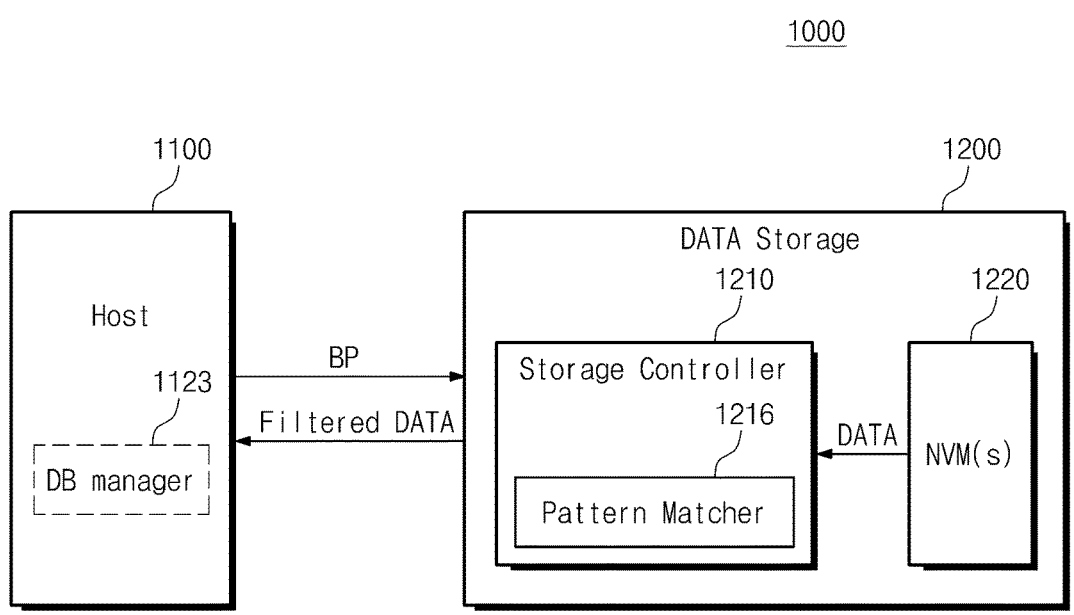
FIG. 1 is a block diagram of a storage system according to an exemplary embodiment.

Exemplary embodiments will be described in detail with reference to the accompanying drawings. The exemplary embodiments, however, may be embodied in various different forms, and should not be construed as being limited only to the illustrated exemplary embodiments. Rather, these exemplary embodiments are provided as examples so that this disclosure will be thorough and complete, and will fully convey the concept of the exemplary embodiments to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, the layer can be the only layer between the two layers, or one or more intervening layers may also be present.

The terminology used herein is for the purpose of describing particular exemplary embodiments only and is not intended to be limiting of the exemplary embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, the element or layer can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of a storage system 1000 according to an exemplary embodiment. As illustrated, the storage system 1000 may include a host 1100 and a data storage 1200.

The host 1100 may include a database (DB) manager 1123. The database manager 1123 generates and executes a query plan according to a user's query request. The query plan may refer to a plan to search a user's desired data from the data storage 1200. The database manager 1123 may generate a specific pattern from the user's query request. Hereinafter, such a specific pattern used to filter data stored in the data storage 1200 may be referred to as a binary pattern BP. The host 1100 transfers a binary pattern BP to the data storage 1200 and performs a filtering operation using the binary pattern BP. User's desired data DATA may be transmitted to the host 1100 based on filtered data.

The data storage 1200 may include a storage controller 1210 and at least one nonvolatile memory device (NVM(s)) 1220. The storage controller 1210 may include a pattern matcher 1216. The pattern matcher 1216 may perform a filtering operation while reading data stored in the nonvolatile memory device 1220. In a typical database management system (DBMS), the host 1100 performs a filtering operation while searching desired data according to a user's query request. Since even a user's unnecessary data is read once and transmitted to the host 1100, the unnecessary data is input and output between the host 1100 and the storage device 1200. Thus, a load of a storage system may increase and search efficiency may be reduced.

However, according to exemplary embodiments, the pattern matcher 1216 is provided in the storage controller 1210 to prevent input or output of unnecessary data. Since the storage controller 1210 filters data except for the user's desired data, the amount of data transmitted to the host 1100 decreases. For example, the pattern matcher 1216 may be provided in a nonvolatile memory interface (not shown) to provide an interface between the storage controller 1210 and the nonvolatile memory device 1220.

Figure 2:
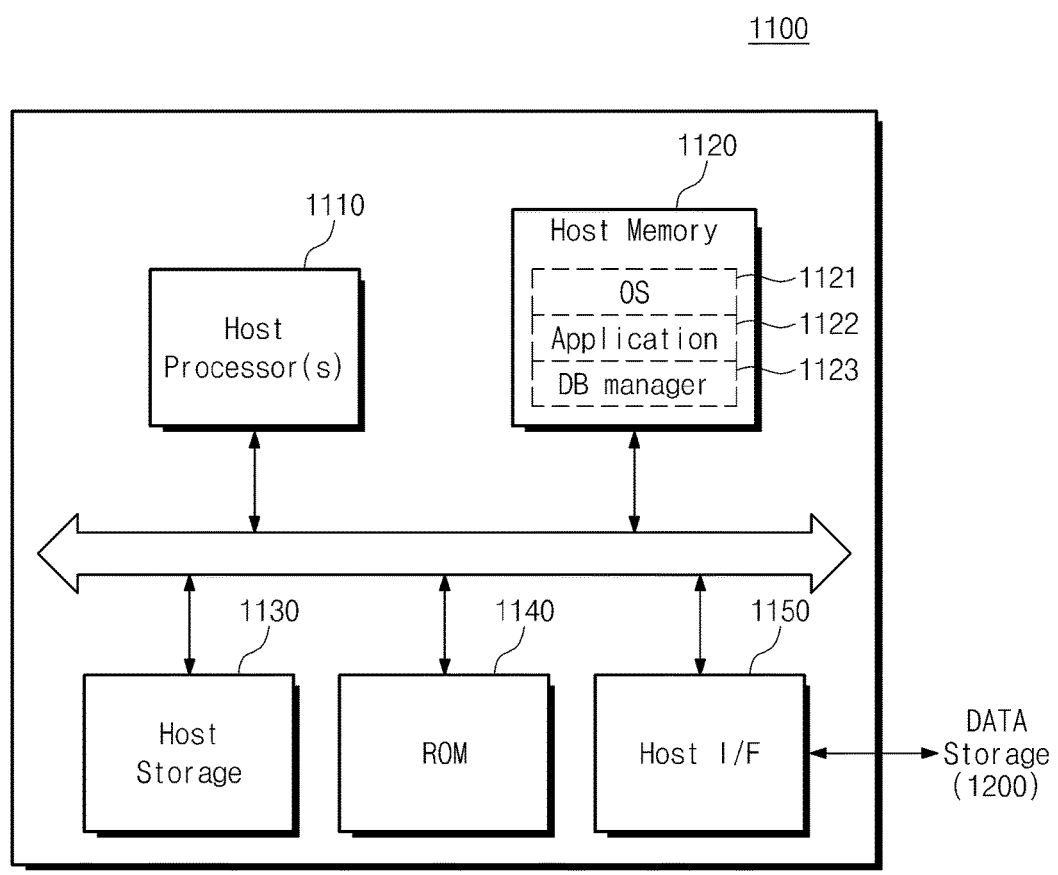
FIG. 2 is a block diagram illustrating a configuration of a host shown in FIG. 1.

FIG. 2 is a block diagram illustrating a configuration of the host 1100 shown in FIG. 1. As illustrated, the host 1100 may include at least one host processor 1110, a host memory 1120, a host storage 1130, a ROM 1140, and a host interface 1150.

The host processor 1110 may control the overall operation of the host 1100. The host processor 1110 may drive an operating system (OS) 1121, an application 1122, and a database manager 1123 to drive the host 1100. For example, the operating system 1121, the application 1122, and the database manager 1123 may be loaded into the host memory 1220 to be driven.

The operating system 1121, the application 1122, and the database manager 1123 may be loaded into the host memory 1220 to drive or control the host 1100. The database manager 1123 generates and executes a query plan according to a user's query request. In this case, the database manager 1123 generates a binary pattern used to load filtered data into the host 1100. A procedure of generating and executing a query plan by the database manager 1123 will be described in detail later with reference to FIG. 4.

An operating system to drive the host 1100, an application, and the like may be stored in the host storage 1130. The operating system, the application, and the like may be loaded into the host memory 1120 to drive the host 1100.

The ROM 1140 may store code data required for initial booting.

The host interface 1150 may provide an interface between the host 1100 and the data storage 1200. For example, the host 1100 and the data storage 1200 may be connected to each other through at least one of various standardized interfaces. The standardized interfaces may include various interfaces such as ATA (Advanced Technology Attachment), SATA (Serial ATA), e-SATA (external SATA), SCSI (Small Computer Small Interface), SAS (Serial Attached SCSI), PCI (Peripheral component Interconnection), PCI-E (PCI Express), USB (Universal Serial Bus), IEEE 1394, and a card interface.

Figure 3:
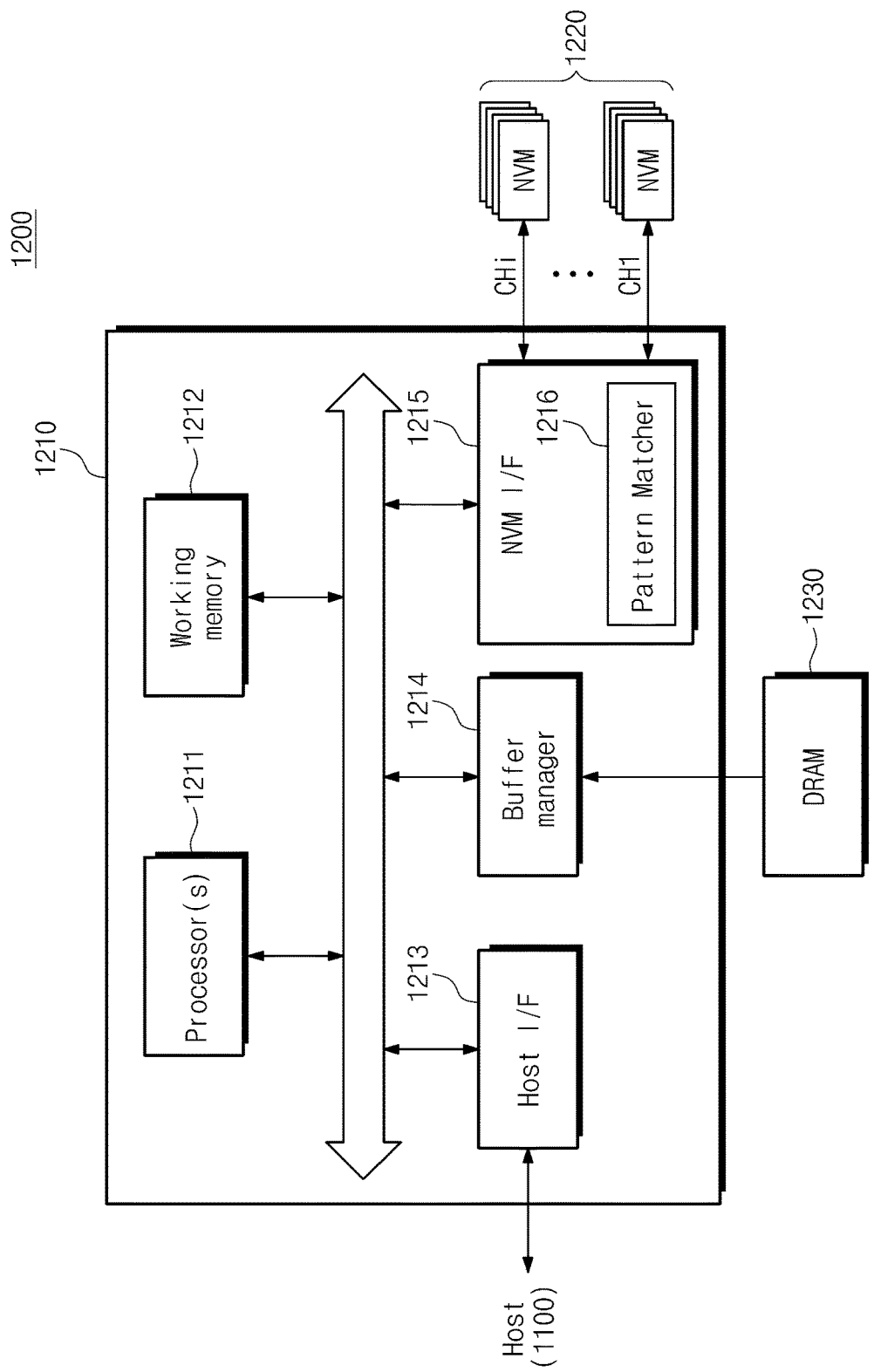
FIG. 3 is a block diagram illustrating a detailed configuration of a data storage shown in FIG. 1.

FIG. 3 is a block diagram illustrating a detailed configuration of the data storage 1200 shown in FIG. 1. As illustrated, the data storage 1200 may include a storage controller 1210, a nonvolatile memory device 1220, and a buffer 1230.

The storage controller 1210 may include at least one processor 1211, a working memory 1212, a host interface 1213, a buffer manager 1214, and a nonvolatile memory interface 1215.

The processor 1211 may control the overall operation of the storage controller 1210. The processor 1211 may drive firmware to drive the storage controller 1210. The firmware may be loaded into the working memory 1212 to be driven and may be a flash translation layer (FTL), although is not limited thereto and may be many other types of firmware.

Software and firmware may be loaded into the working memory 1212 to control the storage controller 1210. For example, a flash translation layer (FTL) may be loaded into the working memory 1212. The working memory 1120 may include at least one of a dynamic random access memory (DRAM), a static random access memory (SRAM), a phase-change RAM (PRAM) or a flash memory.

The host interface 1213 may provide an interface between the host 1100 and the storage controller 1210. The host 1100 and the storage controller 1210 may be connected to each other through at least one of various standardized interfaces. The standardized interfaces may include various interfaces such as ATA (Advanced Technology Attachment), SATA (Serial ATA), e-SATA (external SATA), SCSI (Small Computer Small Interface), SAS (Serial Attached SCSI), PCI (Peripheral component Interconnection), PCI-E (PCI Express), USB (Universal Serial Bus), IEEE 1394, and a card interface.

The buffer manager 1214 may provide an interface between the storage controller 1210 and the buffer 1230. Data to be stored in the nonvolatile memory device 1220 or data to be read from the nonvolatile memory device 1220 may be temporarily stored in the buffer 1230 via the buffer manager 1214.

The nonvolatile memory interface 1215 may provide an interface between the storage controller 1210 and the nonvolatile memory device 1230. For example, the storage controller 1210 may transmit or receive data to or from the nonvolatile memory device 1220 via the nonvolatile memory interface 1215.

The nonvolatile memory interface 1215 may include a pattern matcher 1216. The pattern matcher 1216 may filter data stored in the nonvolatile memory device 1220 while executing a query plan according to a user's query request. For example, when the database manager 1123 (see FIG. 2) transmits a binary pattern to the storage controller 1210 of the nonvolatile memory device 1220 and requests to search each of a plurality of pages stored in the nonvolatile memory device 1220, information of a page including data matching the binary pattern may be transmitted to the pattern matcher 1216. The storage controller 1210 may transmit pages including the data matching the binary pattern to the host 1100 referring to the information according to a read request from the host 1100. The host 1100 may execute the query plan using received pages, and data corresponding to the user's query request may be finally provided to a user.

The nonvolatile memory device 1220 may be a three-dimensional nonvolatile memory device where memory cells connected to a cell string are vertically stacked on a substrate. However, the nonvolatile memory device 1220 is not limited thereto and may be a planar-type memory device or a memory device with memory elements arranged in ways other than vertical stacking or a planar arrangement. The nonvolatile memory device 1220 may be connected to the nonvolatile memory interface 1215 via a plurality of channels CH1 to CHi.

The buffer 1230 may temporarily store data to be stored in the nonvolatile memory device 1220 or data to be read from the nonvolatile memory device 1220. As shown in FIG. 3, the buffer 1230 may be a dynamic random access memory (DRAM), but is not limited thereto. The buffer 1230 may, for example, be a static RAM (SRAM), a phase-change RAM (PRAM), or a combination thereof.

Figure 4:
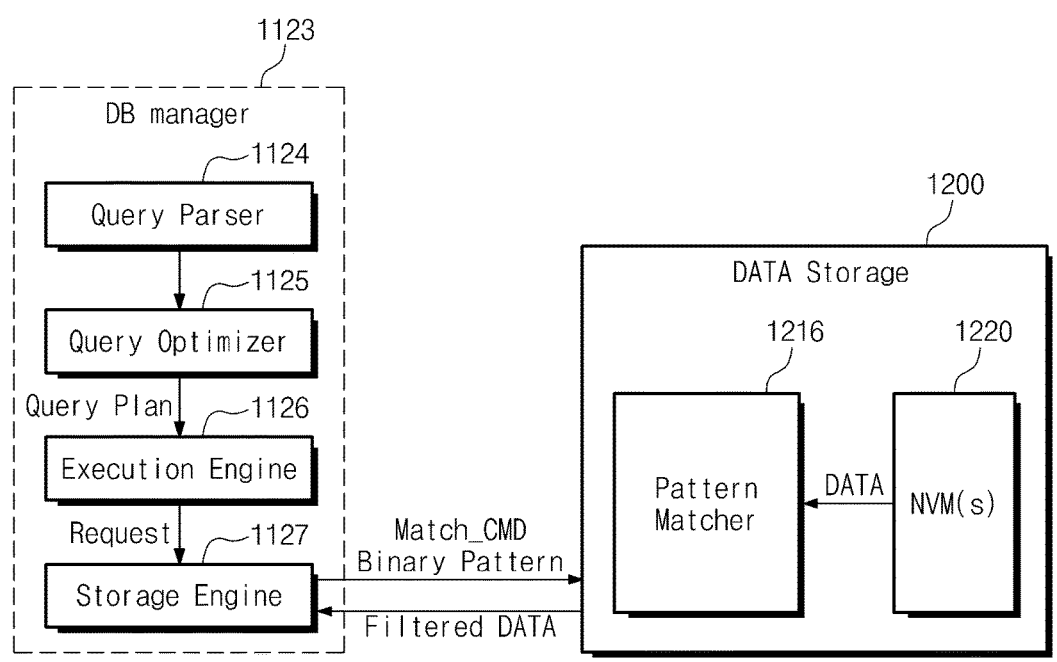
FIG. 4 is a block diagram illustrating a portion of a storage system according to an exemplary embodiment.

FIG. 4 is a block diagram illustrating a portion of a storage system according to an exemplary embodiment. In FIG. 4, a database manager 1123 and a data storage 1200 of a host 1100 are shown.

The database manager 1123 manages data stored in the data storage 1200. The database manager 1123 may be a host system operated or driven by the host processor 1211 (see FIG. 3). For example, the database manager 1123 may include a query parser 1124, a query optimizer 1125, an execution engine 1126, and a storage engine 1127. A procedure of generating and executing a query plan according to a user's query request by the database manager 1123 to search desired data from the data storage 1200 will be described with reference to FIG. 4.

The query parser 1124 parses a user's query request (e.g., query input by a user) to check whether there is an error, such as a grammatical error or an error in the intended meaning of the request. If there is no error, a result of the parsing is transferred to the query optimizer 1125.

The query optimizer 1125 may generate an optimal query plan based on the result of the parsing. The "optimal query plan" may refer to a query plan capable of minimizing data input or output arising between the host 1100 and the data storage 1200. According to an exemplary embodiment, the query optimizer 1125 selects a table that does not refer to another one of the tables stored in the data storage 1200 as a first table of the join order. The query optimizer 1125 selects the first table of the join order considering the number of records and the number of internal search conditions among search conditions constituting a query request. The query optimizer 1125 generates an optimal query plan based on the selected table and transfers the optimal query plan to the execution engine 1126.

The execution engine 1126 executes the query plan generated by the query optimizer 1125. At this point, the execution engine 1126 may transmit a request for starting a filtering operation to the storage engine 1127.

The storage engine 1127 may generate a binary pattern used for the pattern matcher 1216 to filter data referring to the query plan according to the request from the storage engine 1127 and calculate the length of the pattern. The binary pattern may be generated referring to an internal search condition associated with a table selected as a first table of the join order. The "internal search condition" may refer to a search condition which does not refer to another table (e.g., table which is not associated with another table) among search conditions constituting a query request input by a user.

The storage engine 1127 may transmit the binary pattern and information on the length of the pattern to the pattern matcher 1216. The storage engine 1127 may transmit a read command Read_CMD to read a page including data matching the binary pattern to the data storage 1200. The storage controller 1210 may read data stored in the nonvolatile memory device 1220 according to the read command Read_CMD.

However, all the read data are not transmitted to the host 1100. The pattern matcher 1216 filters data stored in the nonvolatile memory device 1220 referring to the received binary pattern and the length of the pattern. More specifically, a filtering operation is performed to check whether a specific pattern exists in a page while the data stored in the nonvolatile memory device 1220 is read in units of pages. The information of the page including the data matching the binary pattern (e.g., matching flag) is transmitted to the storage engine 1127, and the database manager 1123 is used to execute a query request.

According to an exemplary embodiment, the pattern matcher 1216 provided in the data storage 1200 may filter data stored in a nonvolatile memory device. A user's query request may be executed using the filtered data to minimize data input or output arising between a host and the data storage 1200.

[Generation of Query Plan]

FIG. 5 illustrates an example of a user's query, and FIG. 6 is a table of a query plan generated according to an exemplary embodiment. The user's query in FIG. 5 includes, for example, a query to search a lowest price supplier and is written in a structured query language (SQL). A procedure of generating a query plan by a database manager according to an exemplary embodiment will now be described below with reference to the example of FIG. 5.

When a user inputs the query in FIG. 5, the query parser 1124 (see FIG. 4) parses the query to check whether an error exists in the query. If no error exists, the query parser 1124 transmits the query to the query optimizer 1125 (see FIG. 4).

According to an exemplary embodiment, the most important work of the query optimizer 1125 is to decide an order of connecting tables, e.g., join order. Data stored in a nonvolatile memory device is stored in the form of a table according to a type of classification. Since most of the query input by the user refers to multiple tables, the amount of searched data (e.g., record) and query plan processing time vary depending on the join order. A typical query optimizer executes a query plan by selecting a constant table or a table with the smallest number of records as a first join order. Meanwhile, a query optimizer according to an exemplary embodiment generates a query plan by selecting a table expected to have the greatest filtering effect as a first join order.

The query optimizer 1125 (see FIG. 4) determines whether an internal search condition exists in each of the tables stored in a nonvolatile memory device to select a table expected to have the greatest filtering effect. The "internal search condition" may refer to a search condition which does not refer to another table.

For better understanding, as shown in the query in FIG. 5, only 'part' and 'region' tables each include an internal search condition. A search condition such as 'p_partkey=ps_partkey' is not considered to be an internal search condition because the search condition refers to the other tables.

Next, among the tables each having the internal search condition, a table expected to have the greatest early filtering effect is selected. During the selection, the number of all records of each table, the number of the internal search donations of each table, and type of an internal search condition operator of each table are considered.

A table with the largest number of all records may be selected as a first join order. This is because since the amount of filtered data increases as the number of records increases, a probability of reducing the amount of data output from a data storage may increase. In addition, a probability of decreasing the number of records meeting the condition increases as the number of internal search conditions increases. In the case of a search condition operator, a probability of decreasing the number of records is higher in an exact match than in a range match. Thus, a table expected to have the greatest early filtering effect is selected in overall consideration of these factors.

For example, referring to FIG. 6, the query optimizer 1125 (see FIG. 4) generates a query plan by selecting a 'part' table as a first join order. Since a 'partsupp' table, a 'supplier' table, and a 'nation' table each have an external search condition (e.g., a search condition to refer to another table), the 'partsupp' table, the 'supplier' table, and the 'nation' table are excluded as a target of a table of the first join order. Since the number of records and the number of search conditions of the 'part' table are larger than those of a 'region' table, the 'part' table is selected as the first join order.

A subsequent join order is decided to minimize data input or output when a permutation is applied. A method of deciding a join order by applying a permutation is well known to those skilled in the art and will not be described in further detail. If the query plan shown in FIG. 6 is generated, the query optimizer 1125 transmits the query plan to the execution engine 1126 (see FIG. 4) and transmits a request for starting filtering to the storage engine 1127 (see FIG. 4).

[Execution of Query Plan]

Figure 7:
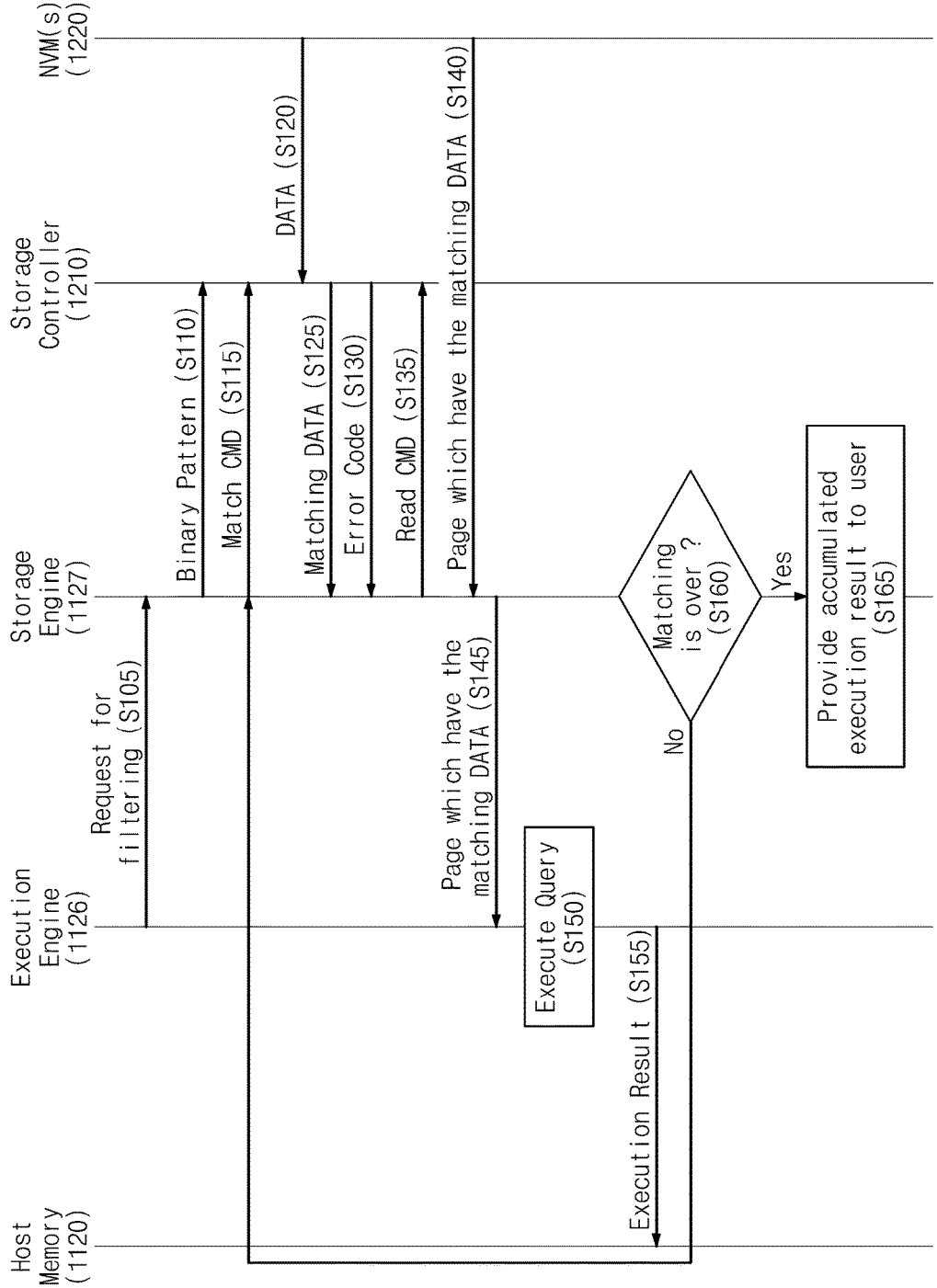
FIG. 7 illustrates a method of executing a query plan according to an exemplary embodiment.

FIG. 7 illustrates a method of executing a query plan according to an exemplary embodiment. A method of executing a query plan will now be described more fully with reference to FIGS. 6 and 7.

When a query plan is generated by the query optimizer 1125, the execution engine 1126 transmits a request for starting filtering to the storage engine at operation S105.

The storage engine 1127 generates a binary pattern and calculates a length of a pattern from a search condition associated with a table selected as a first join order according to the request from the execution engine 1126. The binary pattern is used to specifically search for a user's desired specific data while the pattern matcher 1216 (see FIG. 4) reads data stored in a nonvolatile memory device 1220.

The number of binary patterns generated by the storage engine 1127 may vary depending on types of search conditions. For example, the search condition may include an equality check (e.g., such as '='), a substring check (e.g., such as 'str %', '% str %', and '% str'), and a range check (e.g., such as 'between val1 and val2', '>', '>=', '<', and '<='). Since a 'part' table includes two search conditions, a total of two binary patterns may be generated. For example, search conditions 'p_size=15' and 'BRASS' may be translated into typical binary expression "80 00 00 0f" and American standard code information interchange code (ASCII code) "42 52 41 53 53". Types of the translated codes are not limited thereto and may be various codes that a device can recognize.

The storage engine 1127 may transmit the generated binary pattern to the pattern matcher 1216 (see FIG. 1) in operation S110.

The storage engine 1127 may transmit a match command Match CMD to the pattern matcher 1216 in operation S115. The match command Match CMD may be a command to search a page including data matching a binary pattern BP among pages stored in the nonvolatile memory device 1220. In exemplary embodiments, a matching operation may be performed on a plurality of pages (e.g., hundreds to thousands of pages) by a single match command Match CMD.

The storage controller 1210 searches the data matching the binary pattern BP among data stored in the nonvolatile memory device 1220 according to the match command Match CMD in operation S120. More specifically, the pattern matcher 1216 may search whether the pages stored in the nonvolatile memory device 1220 includes the page matching the binary pattern BP, in units of pages, in operation S120. The pattern match 1216 may transmit information on a page including the data matching the binary pattern BP (e.g., Matching DATA) to the storage engine 1127 as part of operation S120.

The Matching DATA may include a matching flag indicating whether a page which is being searched includes the data matching the binary pattern BP and information on a start position (e.g., a start offset) and an end position (e.g., an end offset) where the matching arises in the page which is being searched. For example, if the page which is being searched includes the data matching the binary pattern BP, a matching flag of the page may be expressed as "1" and matching flag information may be transmitted to the storage engine 1127 in operation S125. Since the page which is being searched may further include data matching a binary pattern between the start offset and the end offset, the pattern match 1216 transmits the information on the start offset and the end offset.

Meanwhile, if the page which is being searched does not include the data matching the binary pattern BP, an error code may be returned in operation S130. That is, a matching flag of the page may be marked as "0".

In exemplary embodiments, the pattern matcher 1216 may transmit Matching DATA on a plurality of pages (e.g., hundreds to thousands of pages) required to determine whether matching occurs and the error code to the storage engine 1127 at one time after gathering the Matching DATA and the error code.

The storage engine 1127 may transmit a read command Read CMD for the page including the data matching the binary pattern BP to the storage controller 1210 in operation S135.

The page including the data matching the binary pattern BP among the data stored in the nonvolatile memory device 1220 may be read according to the read command Read CMD in operation S140. The read page may be transmitted to the execution engine 1126 in operation S145.

The execution engine 1126 executes a query based on the read page in operation S150. A query execution result is transmitted to and stored in the host memory 1120 in operation S155.

The storage engine 1127 may determine whether a matching operation is performed on all of the pages stored in the nonvolatile memory device 1220 in operation S160. If the matching operation is performed on all the pages ("Yes" in operation S160), the query execution result accumulated in the host memory 1120 is provided to a user in operation S165. If the matching operation is not performed on all the pages ("No" in operation S165), the flow proceeds to S115. The storage engine 1127 may transmit a match command CMD to the storage controller 1210 to search the page including the data matching the binary pattern BP with respect to next pages stored in the nonvolatile memory device 1220. As a result, the matching operation is performed on all of the pages stored in the nonvolatile memory device 1220 to provide the query execution result to the user in operation S165.

According to an exemplary embodiment, a table expected to have the most filtered data is selected as a first join order by considering properties of search conditions, the number of records, the number of the search conditions, and the like. A pattern matcher provided in a storage controller performs a filtering operation using a binary pattern generated during execution of a query plan. As a result, data input/output arising between a host and a data storage may be minimized and search speed may be improved.

Figure 8:
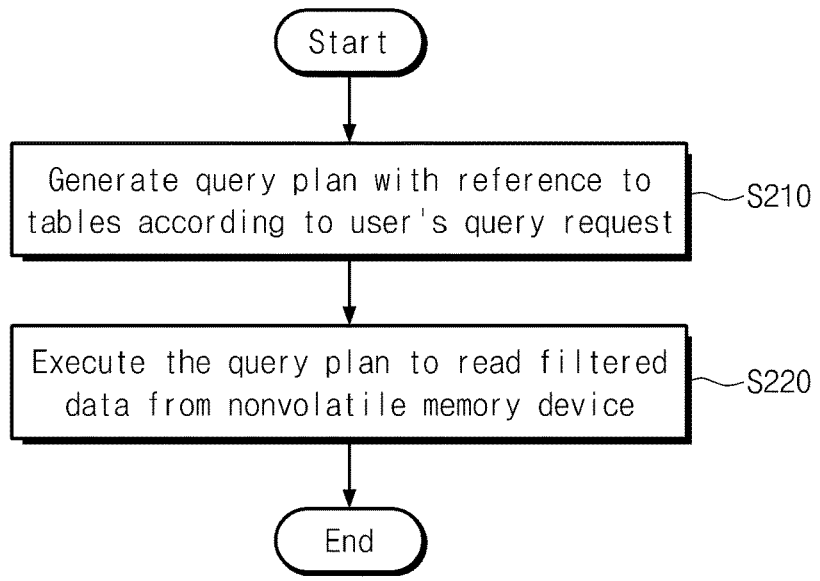
FIG. 8 is a flowchart summarizing a method of operating a storage system according to an exemplary embodiment.

FIG. 8 is a flowchart summarizing a method of operating a storage system according to an exemplary embodiment.

A query plan is generated with reference to multiple tables according to a user's query in operation S210. The query plan selects a table expected to have the greatest filtering effect as a first join order. The table expected to have the greatest filtering effect is selected based on whether an internal search condition exists, the number of records included in the table, the number of search conditions, and the like.

The query plan is executed in operation S220. Data of the table selected as the first join order among tables constituting the query plan is filtered, and data of subsequent tables are searched with reference to keys of the tables. Finally, data corresponding to a user's query request is searched.

Figure 9:
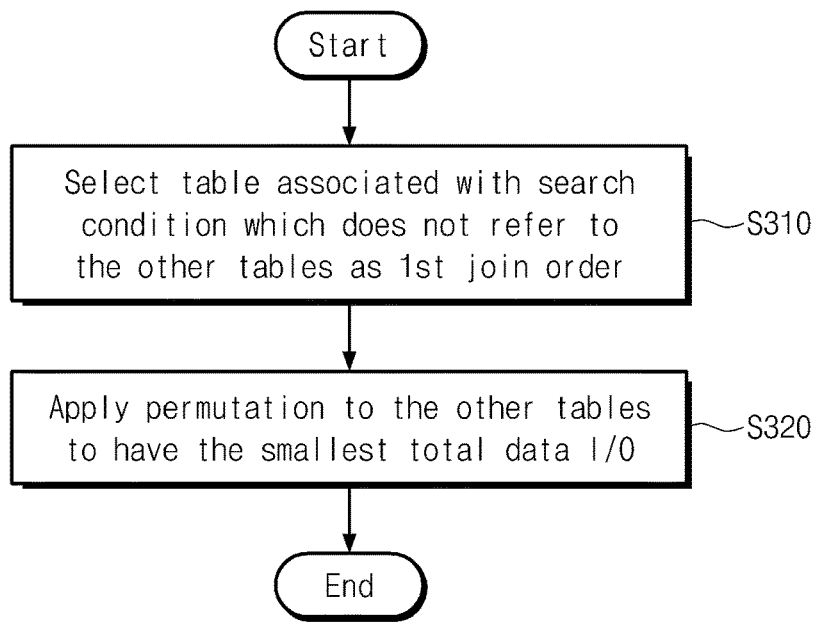
FIG. 9 is a flowchart summarizing a method of generating a query plan according to an exemplary embodiment.

FIG. 9 is a flowchart summarizing a method of generating a query plan according to an exemplary embodiment.

A table associated with a search condition that does not refer to other tables is selected as a first join order in operation S310. That is, a table associated with an internal search condition that is a search condition referring to only its own table is selected as the first join order. If there are multiple tables associated with the internal search condition, a table is selected considering the number of records included in a table, the number of search conditions, and the like.

A permutation is applied to the other tables, in operation S320, to minimize the total data input/output. A method of applying the permutation is known to those skilled in the art. According to a query plan generated according to an exemplary embodiment, data input/output arising between a host and a data storage may be minimized and a search effect may be improved.

Figure 10:
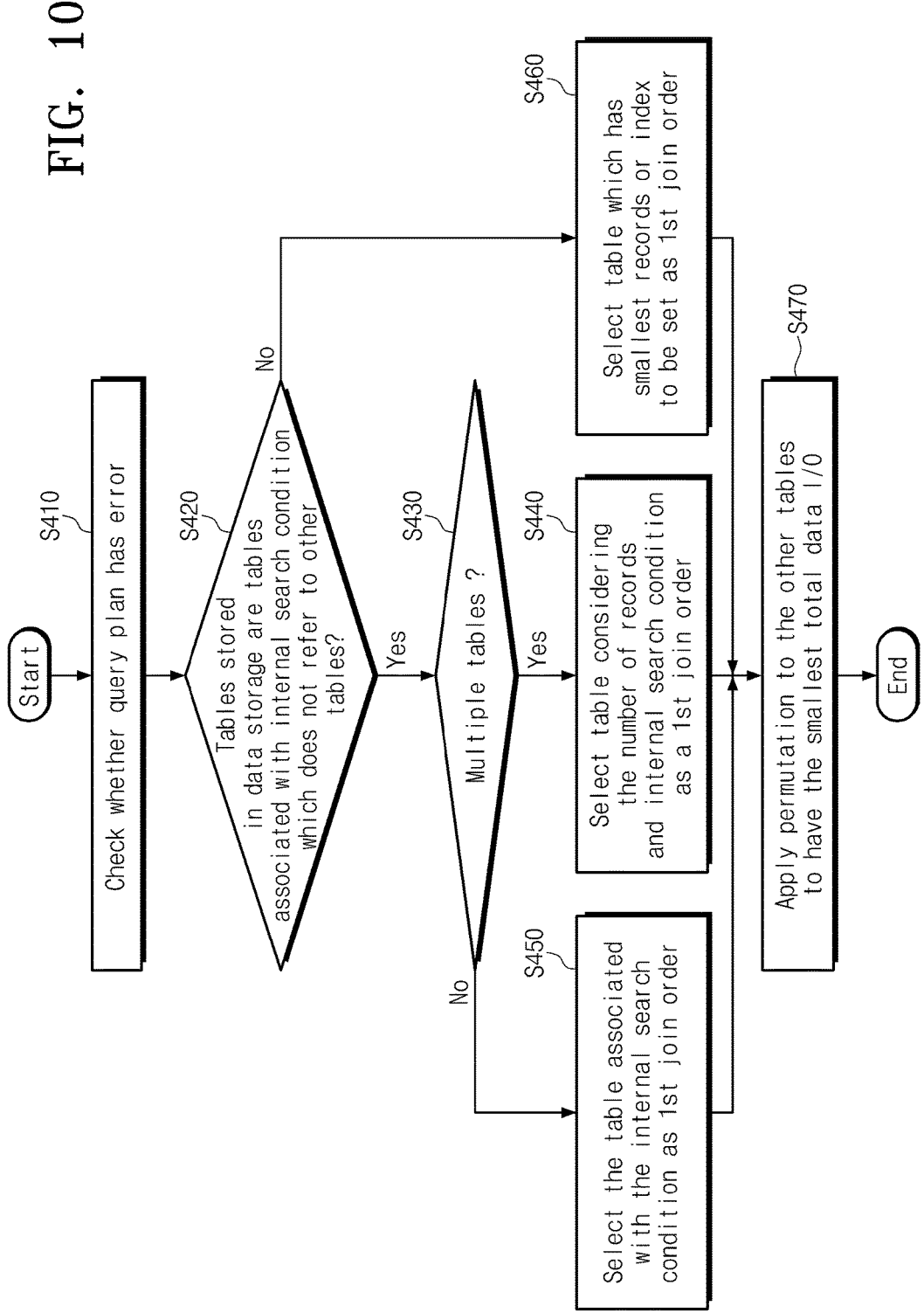
FIG. 10 is a flowchart summarizing a method of executing a query plan according to an exemplary embodiment.

FIG. 10 is a flowchart summarizing a method of executing a query plan according to an exemplary embodiment.

A determination is made as to whether a query plan has an error (e.g., a grammatical error, typographical error, etc.) in operation S410. The determination may be performed by the query parser 1124 (see FIG. 4) constituting a database manager, although is not limited thereto, and may also be performed by other devices.

A determination is made as to whether tables stored in a data storage are tables associated with an internal search condition in operation S420. The "internal search condition" refers to a table that does not refer to other tables. An operation branch occurs according to a result of the determination. If the table is a table associated with the internal search condition ("Yes" in operation S420), the flow proceeds to operation S430. If the table is a table associated with the search condition that refers to other tables ("No" in operation S420), the flow proceeds to operation S440.

A determination is made as to whether the table associated with the internal search condition includes multiple tables in operation S430. An operation branch occurs according to a result of the determination. If multiples tables are associated with the internal search condition ("Yes" in operation S430), the flow proceeds to operation S440. If multiple tables are not associated with the internal search condition ("No" in operation S430), the flow proceeds to operation S450.

A table is selected considering the number of records and the number of internal search conditions in operation S440. A table having the greatest number of records and the greatest number of internal search conditions is selected as a first join order.

In operation S450, since the number of tables associated with the internal search condition is one (as determined in operation S430), the table associated with the internal search condition is selected as the first join order in operation S450.

in operation 460, a first join order is selected by any of various types of methods. That is, since there is no table which has only an internal search condition, a table having the smallest number of records or an index is selected as the first join order. The index may be a data structure in which a key value and a pointer are gathered to improve search performance.

In operation S470, a permutation may be applied to the other tables except for the table selected as the first join order to minimize the total data input or output.

Figure 11:
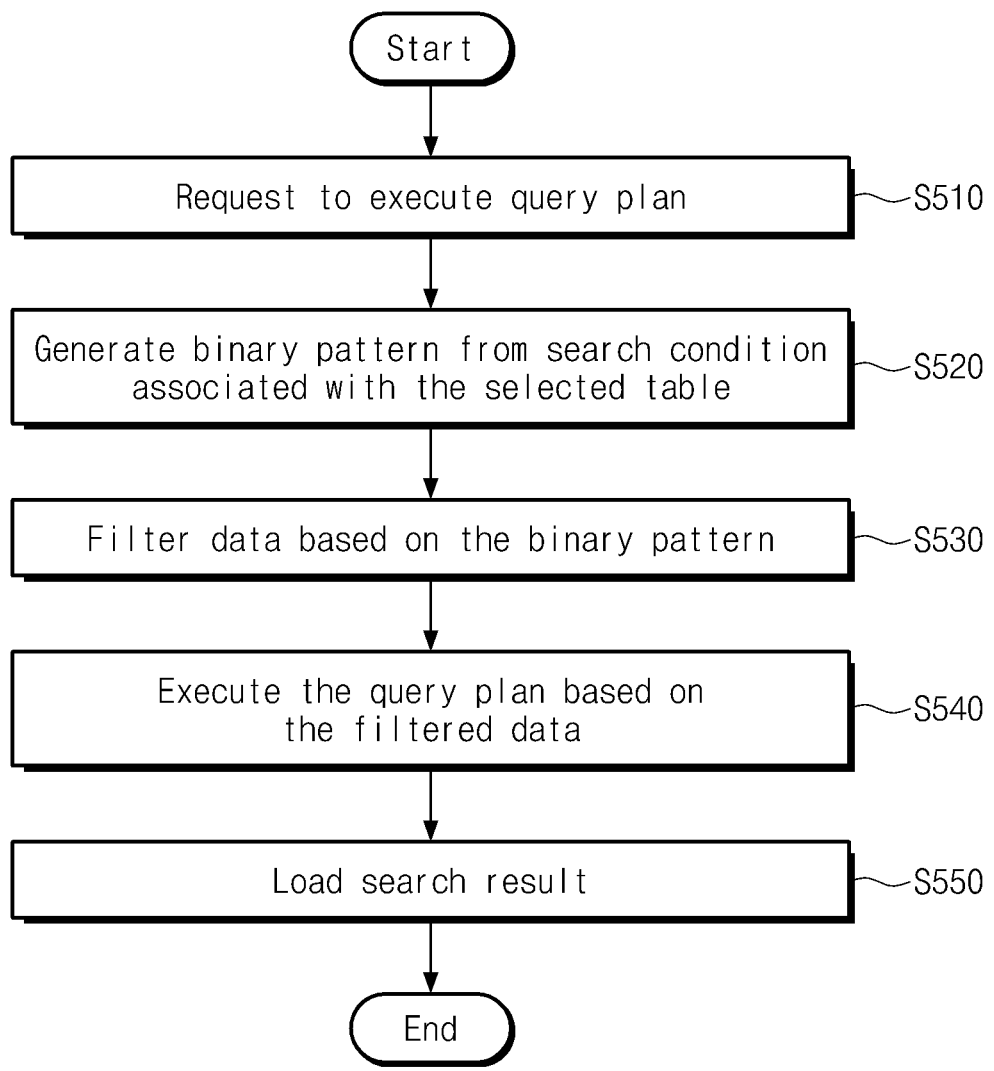
FIG. 11 is a flowchart summarizing a method of executing a query plan according to an exemplary embodiment.

FIG. 11 is a flowchart summarizing a method of executing a query plan according to an exemplary embodiment.

Execution of a query plan is requested in operation S510. For example, when the query plan is generated, an execution engine may request a storage engine to execute the query plan.

A binary pattern may be generated from a search condition associated with the table selected as the first join order in operation S520. Information on the binary pattern generated by a storage engine and length of the binary pattern is transmitted to a pattern matcher of a data storage controller. Together with the information, a read command for data stored in a nonvolatile memory device may also be transmitted to the pattern matcher.

A filtering operation may be performed based on the binary pattern in operation S530. The pattern matcher may search data matching the binary pattern from the data stored in the nonvolatile memory device. The filtering operation may be performed on respective pages constituting the table selected as the first join order.

The query plan is executed based on the filtered data in operation S540. The execution engine may read a page including the data matching the binary pattern and search data corresponding to a user's query referring to a key value of each of the other tables.

A final search result is output in operation S550. For example, the final search result may be loaded into a host memory and may be displayed on various display media such as a display device.

According to exemplary embodiments, a query plan is generated considering whether an internal search condition exists, the number of records of each table, the number of search conditions, and the like to maximize a filtering effect. A pattern matcher provided in a storage controller filters data stored in a nonvolatile memory device using a binary pattern generated during execution of the query plan. As a result, data input/output arising between a host and a data storage may be minimized to improve search speed.

The above-disclosed exemplary embodiments are illustrative only, and not restrictive, and the appended claims are intended to cover all such modifications, enhancements, and other features, which fall within the true spirit and scope of the exemplary embodiments. Thus, to the maximum extent allowed by law, the scope of the exemplary embodiments is to be determined by the broadest permissible interpretation of the following claims and their equivalents, and shall not be restricted or limited by the foregoing detailed description. While some exemplary embodiments have been particularly shown and described, it will be understood by one of ordinary skill in the art that variations in form and detail may be made therein without departing from the spirit and scope of the exemplary embodiments.

What is claimed is:
1. A storage system comprising:
a data storage comprising:
a nonvolatile memory device configured to store data classified into tables, and
a storage controller configured to control the nonvolatile memory device; and a host configured to:
- identify, as a first plurality of tables, each of the tables that comprises a search condition, the search condition being that another table is not referred to, according to a query request,
- identify a selected table from among the first plurality of tables based on a corresponding number of records in each of the first plurality of tables,
- generate a query plan, the query plan comprising a plurality of tables in a join order and the selected table being a first table of the join order,
- generate a binary pattern corresponding to the selected table,
- transmit the binary pattern to the data storage, and
- execute the query plan to eliminate irrelevant data transfer from the data storage based on filtered data received from the data stored in the nonvolatile memory device, wherein the storage controller comprises a pattern matcher configured to receive the binary pattern from the host, and generate and output the filtered data from the data stored in the nonvolatile memory device by performing a filtering operation using the binary pattern.

2. The storage system as set forth in claim 1, wherein the host comprises a database manager comprising:
- a query optimizer configured to generate the query plan that identifies the selected table and puts the selected table first in the join order;
- an execution engine configured to make a request for execution of the query plan according to the query plan; and
- a storage engine configured to generate the binary pattern from the search condition associated with the selected table among a plurality of search conditions according to the request for execution of the query plan.

3. The storage system as set forth in claim 2, wherein the query optimizer is configured to consider a number of search conditions of the query request to identify the selected table.

4. The storage system as set forth in claim 3, wherein the query optimizer is configured to generate the query plan by applying a permutation to tables except for the selected table to minimize data input or output.

5. The storage system as set forth in claim 2, wherein the storage engine further comprises a query parser configured to parse the query request to determine whether an error exists.

6. The storage system as set forth in claim 2, wherein the storage controller comprises a nonvolatile memory interface configured to transmit or receive data to or from the nonvolatile memory device, and
the pattern matcher is provided in the nonvolatile memory interface and is configured to perform the filtering operation based on the binary pattern.

7. The storage system as set forth in claim 6, wherein the host further comprises a buffer configured to temporarily store a query execution result generated based on information of a page including data matching the binary pattern as a result of the filtering operation.

8. The storage system as set forth in claim 7, wherein the information of the page comprises one of a match flag indicating whether the page comprises data matching the binary pattern and information on a start offset and an end offset where the matching arises in the page.

9. The storage system as set forth in claim 1, wherein an interface that directly connects the host and the storage controller is based on one from among advanced technology attachment (ATA), serial ATA (SATA), external SATA (e-SATA), small computer small interface (SCSI), serial attached SCSI (SAS), peripheral component interconnection (PCI), and PCI express (PCI-E).

10. A method of operating a storage system comprising a data storage and a host configured to manage data classified into tables stored in the data storage, the method comprising:
- identifying, as a first plurality of the tables that comprises a search condition, the search condition being that another table is not referred to, according to a query request;
- identifying a selected table from among the first plurality of tables based on a corresponding number of records in each of the first plurality of tables;
- generating a query plan, the query plan comprising a plurality of tables in a join order and the selected table being a first table of the join order;
- generating a binary pattern corresponding to the query plan; and
- executing the query plan based on filtered data received from data stored in the data storage, wherein the method further comprises generating and outputting the filtered data using the binary pattern and a pattern matcher provided in a storage controller configured to control the data storage.

11. The method of claim 10, wherein
the identifying the selected table is based on a number of search conditions of the query request.

12. The method of claim 10, further comprising:
applying a permutation to tables except for the selected table to minimize data input or output of the data storage.

13. The method of claim 10, wherein
the executing the query plan comprises:
- making a request for execution of the query plan according to the query plan;
- generating the binary pattern from the search condition associated with the selected table among a plurality of search conditions according to the request for execution of the query plan; and
- searching data matching the binary pattern.

14. The method of claim 13, wherein
the executing the query plan further comprises:
- reading a page including the data matching the binary pattern;
- searching data corresponding to the query request referring to a key value corresponding to each of the tables except for the selected table; and
- outputting a final search result based on the read page and the searched data.

15. The method of claim 10, wherein
generating the query plan further comprises:
parsing the query request to check whether an error exists in the query request.

16. A data storage device comprising:
- a nonvolatile memory device configured to store data classified into tables; and
- a controller comprising:
    - a host interface circuit configured to:
        - provide an interface between a host device external to the data storage device and the controller; and receive a binary pattern from the host device, wherein the binary pattern being based on a first table, the host device identifying the first table by identifying each of the tables that comprises a search condition as a first plurality of tables, the search condition being that another table is not referred to and identifying the first table from among the first plurality of tables based on a corresponding number of records in each of the first plurality of tables, and the binary pattern being generated by the host device based on the first table in response to a query request; and a nonvolatile memory interface circuit configured to:
provide an interface between the controller and the nonvolatile memory device, and
filter data read from the nonvolatile memory device using the binary pattern, and provide the filtered data to the host device.

17. The data storage device of claim 16, wherein the nonvolatile memory interface circuit comprises a pattern matching circuit configured to filter the data read from the nonvolatile memory device using the binary pattern.

18. The data storage device of claim 16, wherein the controller is further configured to:
from the host device, receive match command to search a page, from among pages stored in the nonvolatile memory device, including data matching the binary pattern, and
transmit information on the data matching the binary pattern to the host device.

19. The data storage device of claim 18, wherein the information includes:
a matching flag indicating whether the searched page includes the data matching the binary pattern, and
position information on a start position and an end position where the matching arises in the page which is being searched.

20. The data storage device of claim 19, wherein the controller is further configured to:
receive a read command from the host device based on the searched page including the data matching the binary pattern, and
read the page including the data matching the binary pattern from the nonvolatile memory device.

* * * * *